(12) United States Patent
Murakami (10) Patent No.: US 7,694,601 B2
(45) Date of Patent: Apr. 13, 2010

(54) GEAR DEVICE AND ELECTRIC POWER STEERING APPARATUS

(75) Inventor: Tetsuya Murakami, Nara (JP)

(73) Assignee: JTEKT Corporation, Osaka (JP)

( * ) Notice: Subject to any disclaimer, the term of this patent is extended or adjusted under 35 U.S.C. 154(b) by 195 days.

(21) Appl. No.: 11/727,253

(22) Filed: Mar. 26, 2007

(65) Prior Publication Data
US 2007/0240536 A1    Oct. 18, 2007

(30) Foreign Application Priority Data
Mar. 29, 2006  (JP) .............................. 2006-092088

(51) Int. Cl.
*F16H 57/04* (2010.01)
(52) U.S. Cl. .................. 74/467; 74/388 PS; 74/606 R; 184/11.1
(58) Field of Classification Search ............... 184/11.1, 184/43; 74/467, 606 R, 468, 388 PS
See application file for complete search history.

(56) References Cited

U.S. PATENT DOCUMENTS

| | | | | |
|---|---|---|---|---|
| 2,534,536 | A * | 12/1950 | Staude | 74/388 PS |
| 3,508,630 | A * | 4/1970 | Keller | 184/11.1 |
| 3,785,458 | A * | 1/1974 | Caldwell et al. | 184/6.12 |
| 4,057,126 | A * | 11/1977 | Stephens | 184/11.1 |
| 4,470,324 | A * | 9/1984 | Renk et al. | 74/606 R |
| 5,064,025 | A * | 11/1991 | Richards | 184/6.12 |
| 5,291,970 | A * | 3/1994 | Vinciguerra et al. | 184/11.2 |
| 5,480,003 | A * | 1/1996 | Hill et al. | 184/6.12 |
| 5,651,425 | A * | 7/1997 | Hill et al. | 184/6.12 |
| 6,516,789 | B1 * | 2/2003 | Jones | 123/559.1 |

FOREIGN PATENT DOCUMENTS

| | | |
|---|---|---|
| JP | 05-45293 | 6/1993 |
| JP | 2000-193070 | 7/2000 |

* cited by examiner

*Primary Examiner*—Richard W Ridley
*Assistant Examiner*—Terence Boes
(74) *Attorney, Agent, or Firm*—Rabin & Berdo, PC (57) ABSTRACT

A housing of a gear device houses a plurality of gears and a lubricant. On at least one side surface of at least one gear selected from the plurality of gears, an extended projection is provided. On a side surface of the housing facing the side surface of the selected gear, an extended projection is provided. The extended projection of the selected gear and the extended projection of the housing extend in a direction crossing the circumferential direction of the selected gear. When viewed along an axial direction of the selected gear, according to rotation of the selected gear, the extended projection of the selected gear and the extended projection of the housing partially face each other in the axial direction of the selected gear and form facing portions. A lubricant holding portion capable of holding the lubricant is formed between the facing portion of the extended projection of the selected gear and the facing portion of the extended projection of the housing.

14 Claims, 8 Drawing Sheets

GEAR DEVICE AND ELECTRIC POWER STEERING APPARATUS

BACKGROUND OF THE INVENTION

1. Field of the Invention

The present invention relates to a gear device and an electric power steering apparatus.

2. Description of Related Arts

A gear device for transmitting an output of a driving source such as an electric motor is known (for example, refer to the following document 1).

Document 1: Japanese Unexamined Utility Model Publication No. 05-45293

In this gear device, an output of an electric motor is transmitted to a load via a planet gear mechanism. To an output shaft of the electric motor, a sun gear is coupled. Between the sun gear and a ring gear, a planet gear is disposed. On the side surface of the planet gear, a concave groove for storing a lubricant is formed. Due to a centrifugal force associated with rotation of the planet gear (rotation and/or revolution), the lubricant in the concave groove is scattered. Thereby, the lubricant is spattered on the teeth of the gear.

However, to sufficiently spatter the lubricant on the surroundings by a centrifugal force, the rotational speed of the planet gear having the concave groove formed thereon must be high. Therefore, the driving conditions which enable sufficient lubrication are narrowed. For example, in a reduction gear mechanism which transmits an output of an electric motor to a steering mechanism, the rotational speed of a driven gear continued into the steering mechanism is comparatively slow (for example, several rpm). Therefore, it is difficult to sufficiently spatter the lubricant on the surroundings and sufficient lubrication is difficult. Particularly, when grease is used for lubrication, it is more difficult to scatter the grease by a centrifugal force.

The same problem occurs also in other general gear device as well as the gear device installed in an electric power steering apparatus.

The present invention is made against this background, and an object thereof is to provide a gear device and an electric power steering apparatus which realize sufficient lubrication under wider driving conditions.

SUMMARY OF THE INVENTION

To achieve the above-described object, a preferred aspect of the invention includes a plurality of gears which mesh with each other, a housing for housing the plurality of gears, and a lubricant housed in the housing. On at least one side surface of at least one gear selected among the gears, an extended projection is provided. On the side surface of the housing facing the side surface of the selected gear, an extended projection is provided. The extended projection of the selected gear and the extended projection of the housing extend in a direction crossing the circumferential direction of the selected gear. When viewed along an axial direction of the selected gear, according to rotation of the selected gear, the extended projection of the selected gear and the extended projection of the housing partially face each other in the axial direction of the selected gear and form facing portions to form a lubricant holding portion capable of holding the lubricant between the facing portion of the extended projection of the selected gear and the facing portion of the extended projection of the housing.

According to this aspect, along with rotation of the selected gear, the facing portions and the lubricant held between the facing portions can be moved in the direction in which the extended projection of the selected gear extends. Thereby, the lubricant can be moved to the tooth portion of the selected gear. As a result, to the mesh portion between the gears to mesh with each other, a sufficient amount of lubricant can be supplied. By moving the lubricant while being held between the facing portions, it is unnecessary to use a centrifugal force for moving the lubricant. Therefore, even when the rotational speed of the selected gear is as low as several rpm, the lubricant can be reliably moved and supplied to the tooth portion of the selected gear. Without being influenced by the rotational speed of the selected gear, sufficient lubrication can be performed under wider driving conditions. As the lubricant, lubricating oil can be used, and grease can also be used as the lubricant. Various lubricants can be applied and sufficient lubrication can be performed in wider driving conditions.

DETAILED DESCRIPTION OF THE PREFERRED EMBODIMENT

A preferred embodiment of the invention will be described with reference to the accompanying drawings.

Figure 1:
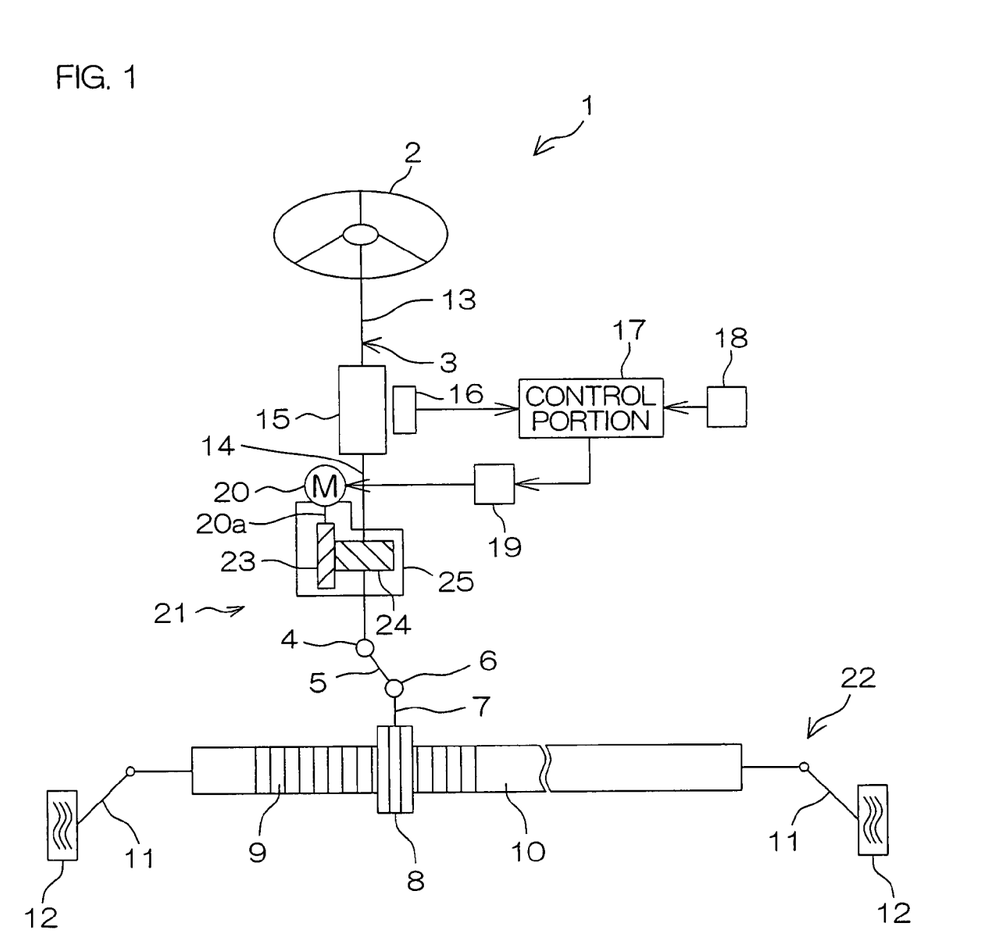
FIG. 1 is a schematic view showing a schematic construction of an electric power steering apparatus of an embodiment of the invention.

FIG. 1 is a schematic view showing a schematic construction of an electric power steering apparatus 1 of an embodiment of the invention.

Referring to FIG. 1, the electric power steering apparatus 1 includes a steering shaft 3 coupled to a steering member 2 of a steering wheel or the like, an intermediate shaft 5 joined to the steering shaft 3 via a universal joint 4, a pinion shaft 7 coupled to the intermediate shaft 5 via a universal joint 6, and a rack shaft 10 on which a rack 9 is formed to mesh with a pinion 8 provided on a tip end of the pinion shaft 7.

The rack shaft 10 extends in the left and right direction of a vehicle. To both ends of the rack shaft 10, tie rods 11 are coupled, respectively. Each tie rod 11 is coupled to a corresponding wheel 12 via a corresponding knuckle arm (not shown).

When the steering member 2 is operated and the steering shaft 3 is rotated, this rotation is transmitted to the pinion 8 via the intermediate shaft 5, etc. The rotation of the pinion 8 is converted into a linear movement of the rack shaft 10 along the left and right direction of the vehicle by the pinion 8 and the rack 9. Thereby, steering of the wheel 12 is realized.

The steering shaft 3 includes a first steering shaft 13 as an input shaft continued into the steering member 2 and a second steering shaft 14 as an output shaft continued into the universal joint 4. The first and second steering shafts 13 and 14 are coupled to each other via a torsion bar 15 relatively rotatably. The axis of the steering shaft 13 and the axis of the second steering shaft 14 coincide with each other.

Near the torsion bar 15, a torque sensor 16 is provided. This torque sensor 16 detects relative rotational displacement between the first steering shaft 13 and the second steering shaft 14 caused by twisting of the torsion bar 15. A detection signal of this torque sensor 16 is supplied to a control portion 17.

The control portion 17 calculates a steering torque applied to the steering member 2 based on the detection signal from the torque sensor 16. Then, based on the calculated steering torque and a vehicle speed detection signal from a vehicle speed sensor 18, the control portion 17 controls the driving of the electric motor 20 for assisting steering via a driver 19.

Thereby, the electric motor 20 is driven and the rotation (output) of an output shaft 20a of the electric motor 20 is reduced by a reduction gear 21 as a gear device and transmitted to the second steering shaft 14. The power transmitted to the second steering shaft 14 is transmitted to a steering mechanism 22 including the rack shaft 10, the tie rods 11, and the knuckle arms via the intermediate shaft 5 to assist driver's steering.

The reduction gear 21 includes a drive gear 23 and a driven gear 24 as the plurality of gears, and a housing 25 for housing these drive gear 23 and driven gear 24.

The drive gear 23 is a small gear continued into the output shaft 20a of the electric motor 20, and the driven gear 24 is a large gear that meshes with the drive gear 23 and is continued into the second steering shaft 14.

Figure 2:
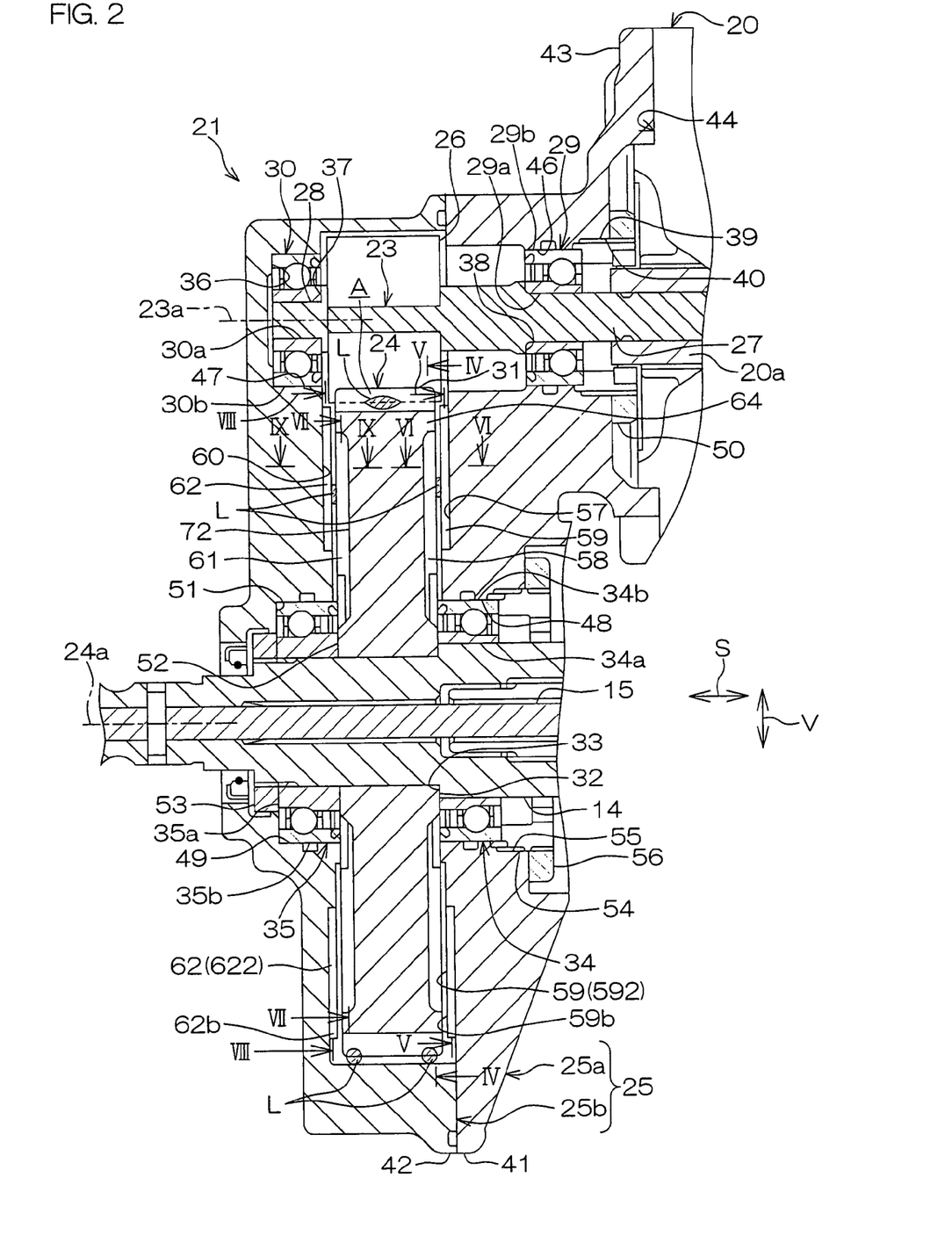
FIG. 2 is a sectional view of a main portion around a reduction gear of FIG. 1.

FIG. 2 is a sectional view of a main portion around the reduction gear 21 of FIG. 1. Referring to FIG. 2, the housing 25 is formed using an aluminum alloy. This housing 25 is formed into a cylindrical shape as a whole, and includes a first housing 25a and a second housing 25b. These first and second housings 25a and 25b face each other in an axial direction S of the steering shaft 3 (also an axial direction of the driven gear 24).

An outer peripheral portion 41 on one end of the first housing 25a and an outer peripheral portion 42 of the second housing 25b are in contact with each other. These outer peripheral portions 41 and 42 are fixed to each other using bolts or the like (not shown). The first and second housings 25a and 25b are supported onto a vehicle body (not shown) using bolts or the like. On an upper end in the vertical direction V of the first housing 25a, an annular flange 43 is provided. To the flange 43, a housing 44 of the electric motor 20 is fitted. The housing 44 of the electric motor 20 is fixed to this flange 43.

The drive gear 23 and the driven gear 24 are formed of, for example, helical gears, respectively. By these drive gear 23 and driven gear 24, a gear mechanism having axis parallel to each other is formed. The drive gear 23 and driven gear 24 may be spur gears, respectively. A worm shaft may be used as the drive gear and a worm wheel is used as the driven gear to form a worm reduction gear mechanism.

The axis 23a of the drive gear 23 and the axis 24a as the center of the driven gear 24 are parallel to the axial direction S of the steering shaft 3, and cross the vertical direction V. In a mesh region A of the drive gear 23 and the driven gear 24, an appropriate backlash is provided between the drive gear 23 and the driven gear 24. This mesh region A is positioned at the upper end in the vertical direction V of the driven gear 24.

In the housing 25, a lubricant L is housed. The lubricant L is present in the mesh region A of the drive gear 23 and the driven gear 24. The lubricant L is, for example, a grease.

The drive gear 23 includes a tooth portion 26 to mesh with the driven gear 24, and a pair of support shafts 27 and 28 extending from the pair of ends of the tooth portion 26. One support shaft 27 is coupled to the output shaft 20a of the electric motor 20 integrally rotatably by means of spline fitting or the like. The one support shaft 27 and the other support shaft 28 are provided with first and second bearings 29 and 30, respectively, for rotatably supporting the drive gear 23.

The first and second bearings 29 and 30 are formed of rolling bearings such as angular ball bearings. The inner rings 29a and 30a of the first and second bearings 29 and 30 are fitted to the corresponding support shafts 27 and 28 integrally rotatably, respectively.

The outer ring 29b of the first bearing 29 is fitted to a bearing holding hole 46 of the first housing 25a while its relative rotation is restricted. The outer ring 30b of the second bearing 30 is fitted to a bearing holding hole 47 of the second housing 25b while its relative rotation is restricted.

The driven gear 24 is fitted to the second steering shaft 14 of the steering shaft 3 integrally rotatably so as not to relatively move axially. On an outer diameter portion 64 of the driven gear 24, a tooth portion 31 is formed. This tooth portion 31 meshes with the tooth portion 26 of the drive gear 23. One side surface 32 of the driven gear 24 is received by an annular step 33 of the second steering shaft 14 and its relative movement to one side of the axial direction S is restricted.

On the second steering shaft 14 as a support shaft of the driven gear 24, third and fourth bearings 34 and 35 for rotatably supporting the driven gear 24 are provided. The third and fourth bearings 34 and 35 are formed of rolling bearings such as angular ball bearings, respectively. The third and fourth bearings 34 and 35 sandwich the driven gear 24 in the axial direction. The inner rings 34a and 35a of each third and fourth bearings 34 and 35 are fitted to the second steering shaft 14 integrally rotatably.

The outer ring 34b of the third bearing 34 is fitted to a bearing holding hole 48 of the first housing 25a while its relative rotation is restricted. The outer ring 35b of the fourth bearing 35 is fitted to a bearing holding hole 49 of the second housing 25b while its relative rotation is restricted.

The first and second bearings 29 and 30 are positioned in the axial direction and applied with a preload as follows. That is, the outer ring 30b of the second bearing 30 is positioned by contact with a step 36 on the second housing 25b. The inner ring 30a of the second bearing 30 is restricted from moving to one end side of the drive gear 23 (electric motor side) by contact with a positioning step 37 on the other end of the drive gear 23.

The inner ring 29a of the first bearing 29 is restricted from moving to the other end side of the drive gear 23 by contact with a positioning step 38 on one support shaft 27. The outer ring 29b of the first bearing 29 is urged to the second bearing 30 side by a screw member 39 for preload adjustment.

The screw member 39 applies a preload to the first and second bearings 29 and 30 and positions the drive gear 23 axially by being screwed in a screw hole 40 formed in the first housing 25a. A locknut 50 meshes with the screw member 39 for locking the screw member 39 after preload adjustment.

The third and fourth bearings 34 and 35 are positioned axially and applied with a preload as follows. That is, the outer ring 35b of the fourth bearing 35 is positioned by contact with a step 51 on the second housing 25b. The inner ring 35a of the fourth bearing 35 is restricted from moving to one end side of the driven gear 24 (third bearing 34 side) by contact with the other surface 52 of the driven gear 24. The inner ring 35a of this fourth bearing 35 is sandwiched in the axial direction S by a screw member 53 screwed in the second steering shaft 14 and the other side surface 52.

The inner ring 33a of the third bearing 34 is restricted from moving to the fourth bearing 35 side by contact with the one side surface 32 of the driven gear 24. The outer ring 34b of the third bearing 34 is urged to the fourth bearing 35 side by a screw member 54 for preload adjustment.

The screw member 54 applies a preload to the third and fourth bearings 34 and 35 and positions the driven gear 24 in the axial direction S by being screwed in a screw hole 55 formed in the first housing 25a. A locknut 56 meshes with the screw member 54 for locking the screw member 54 after preload adjustment.

Figure 3:
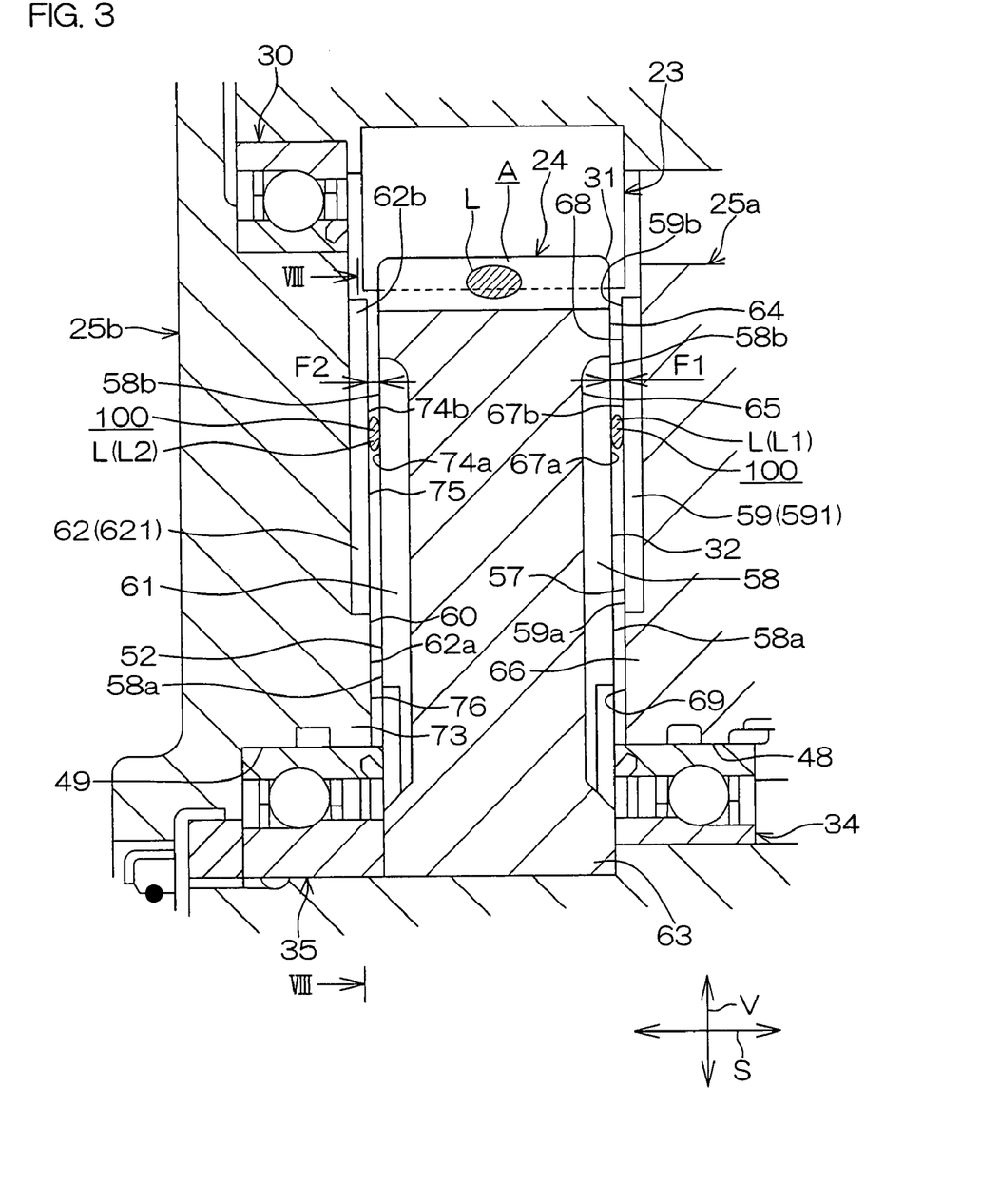
FIG. 3 is a partially enlarged view of FIG. 2.

FIG. 3 is a partially enlarged view of FIG. 2. Referring to FIG. 3, a main feature of this embodiment is as follows. That is, both of the lubricant L (L1) between the driven gear 24 as a selected gear and the first housing 25a, and the lubricant L (L2) between the driven gear 24 and the second housing 25b are made movable in a direction crossing the circumferential direction of the driven gear 24 according to a rotating operation of the driven gear 24.

In detail, on each of the one side surface 32 of the driven gear 24 and one side surface 57 of the first housing 25a facing this side surface 32, one or a plurality of extended projections 58 and 59 are provided. At least either one of the extended projections 58 or 59 crosses the circumferential direction C of the driven gear 24.

Similarly, on each of the other side surface 52 of the driven gear 24 and one side surface 60 of the second housing 25b facing the other side surface 52, one or a plurality of extended projections 61 and 62 are provided. At least either one of the extended projections 61 or 62 crosses the circumferential direction C of the driven gear 24.

Figure 4:
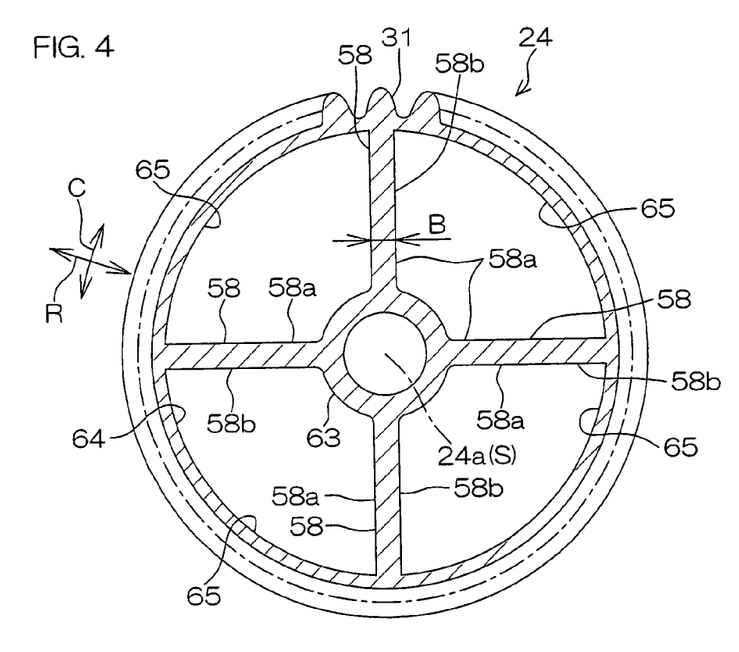
FIG. 4 is a sectional view of a driven gear along the IV-IV line of FIG. 2.
Figure 5:
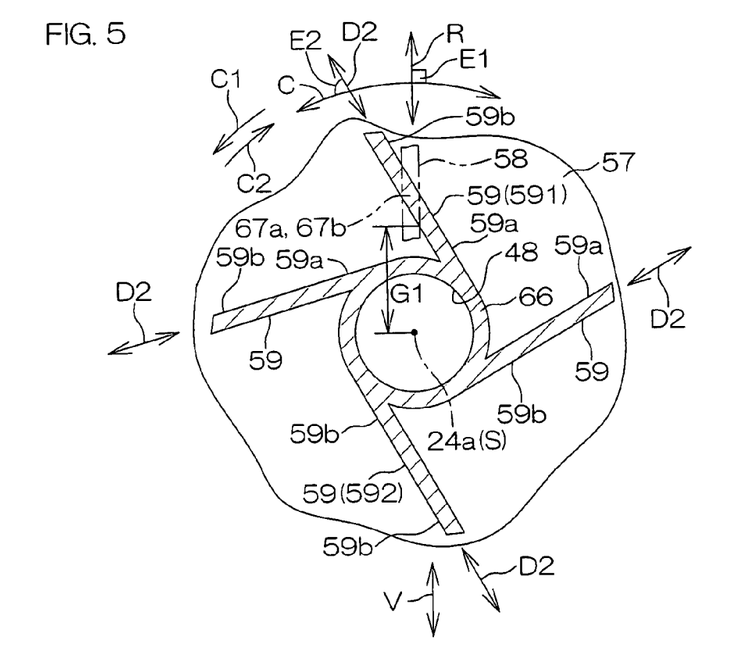
FIG. 5 is a sectional view of a main portion along the V-V line of FIG. 2, illustrating a first housing and a part of the extended projections.
Figure 6:
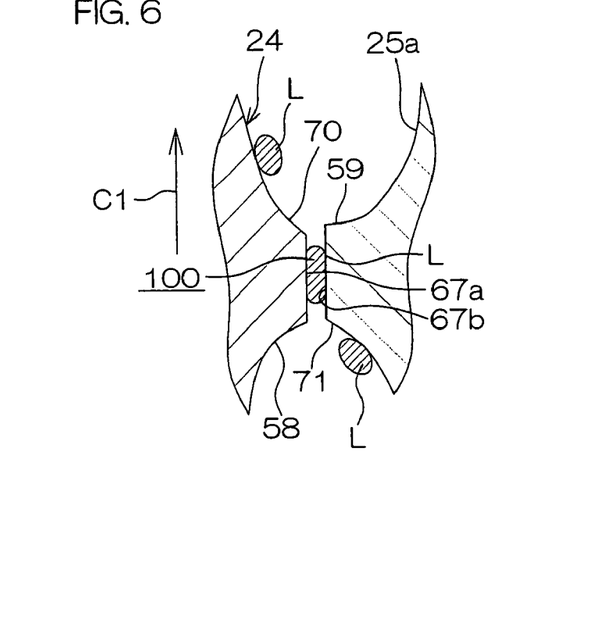
FIG. 6 is a sectional view of a main portion along the VI-VI line of FIG. 2.
Figure 7:
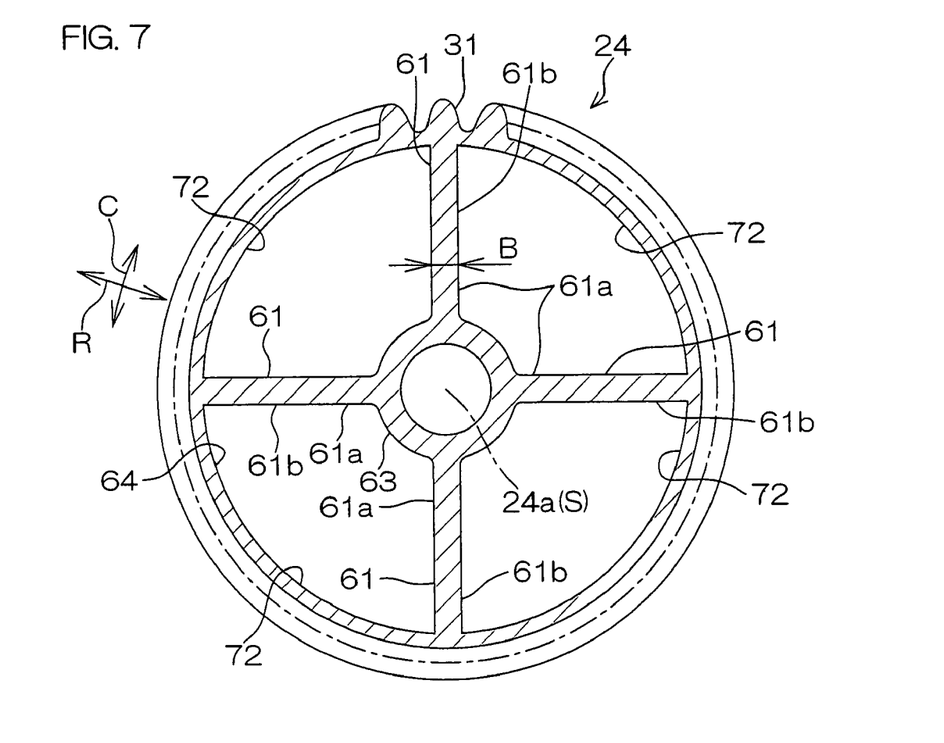
FIG. 7 is a sectional view of a driven gear along the VII-VII line of FIG. 2.
Figure 8:
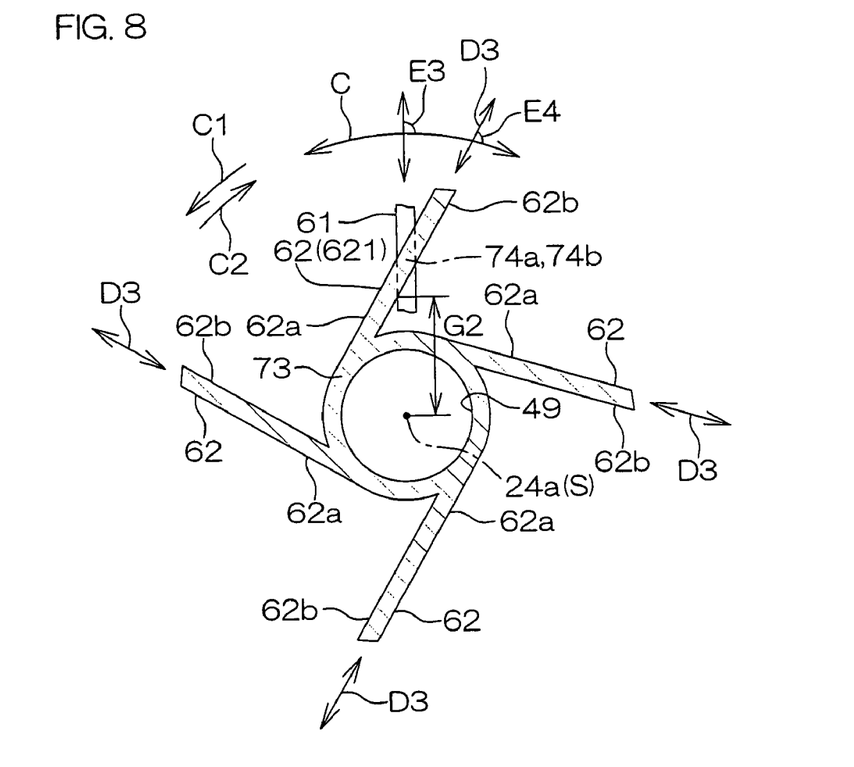
FIG. 8 is a sectional view of a main portion along the VIII-VIII line of FIG. 2, illustrating a second housing and a part of the extended projections.
Figure 9:
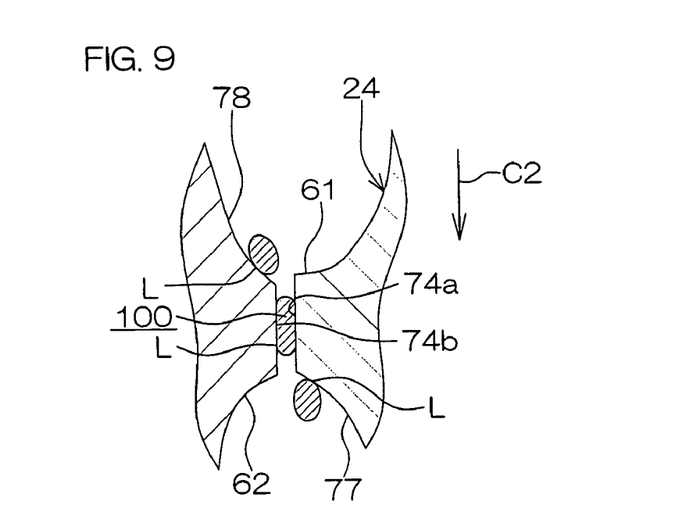
FIG. 9 is a sectional view of a main portion along the IX-IX line of FIG. 2.

FIG. 4 is a sectional view of the driven gear 24 along the IV-IV line of FIG. 2. FIG. 5 is a sectional view of a main portion along the V-V line of FIG. 2, illustrating the first housing 25a and a part of the extended projections 58. FIG. 6 is a sectional view of a main portion along the VI-VI line of FIG. 2. FIG. 7 is a sectional view of the driven gear 24 along the VII-VII line of FIG. 2. FIG. 8 is a sectional view of a main portion along the VIII-VIII line of FIG. 2, illustrating the second housing 25b and a part of the extended projections 61. FIG. 9 is a sectional view of a main portion along the IX-IX line of FIG. 2.

Referring to FIG. 3 and FIG. 4, the one side surface 32 of the driven gear 24 is a plane extending orthogonally in the axial direction S. On the one side surface 32, a plurality of concave portions 65 are formed between an inner diameter portion 63 and an outer diameter portion 64 of the driven gear 24. These concave portions 65 are in fan shapes respectively when they are viewed along the axial direction S. Between the concave portions 65 adjacent to each other in the circumferential direction C of the driven gear 24, extended projections 58 are provided. For example, four extended projections 58 are provided at even intervals in the circumferential direction C.

The number of the extended projections 58 on the one side surface 32 may be one, two, or three, or may be five or more.

Each extended projection 58 is formed between the inner diameter portion 63 and the outer diameter portion 64, and extends along a radial direction R of the driven gear 24 as a direction crossing the circumferential direction C (first direction). That is, the extended projection 58 crosses the circumferential direction C at generally 90 degrees, and extends radially.

The extended projection 58 may cross the circumferential direction C at an angle less than 90 degrees. Each extended projection 58 has a predetermined width B.

The inner diameter portion 63 is formed in an annular shape, and connects one end portions 58a of the extended projection 58 to each other. The outer diameter portion 64 is formed in an annular shape, and connects the other end portions 58b of the extended projection 58 to each other.

Referring to FIG. 3 and FIG. 5, the one side surface 57 of the first housing 25a extends orthogonally in the axial direction S. The extended projections 59 of the first housing 25a is projectedly provided on the side surface 57.

In this embodiment, corresponding to the number of the extended projections 58, four extended projections 59 are provided at even intervals in the circumferential direction C, however, the number of the extended projections 59 on the one side surface 57 may be one, two, or three, or may be five or more.

On one side surface 57, an annular inner diameter portion 66 surrounding the bearing holding hole 48 for supporting the third bearing 34 is projectedly provided. The extended projection 59 extends along the second directions D2 as directions crossing the circumferential direction C from the inner diameter portion 66. The second directions D2 have an angle of several tens of degrees (for example, 50 degrees) with respect to the circumferential direction C. On the section shown in FIG. 5 (view the first housing 25a from the driven gear 24), one end portion 59a of the extended projection 59 is at a position skewed to the other side C2 of the circumferential direction with respect to the other end portion 59b.

Viewed along the axial direction S, the extended projection 58 crosses the circumferential direction C at a crossing angle E1. Viewed along the axial direction S, the extended projection 59 crosses the circumferential direction C at a crossing angle E2. Viewed along the axial direction S, the paired extended projections 58 and 59 are inclined oppositely to each other with respect to the circumferential direction C, and cross the circumferential direction C at the different crossing angles E1 and E2.

The one end portion 59a of the extended projection 59 is connected to each other by the inner diameter portion 66. The other end portion 59b of the extended projection 59 faces the tooth portion 31 of the driven gear 24 in the axial direction S. The other end portion 59b of one extended projection 59 (591) positioned highest in the vertical direction V among the extended projections 59 is close to the mesh region A of the gears 23 and 24.

Referring to FIG. 2, the other end portion 59b of one extended projection 59 (592) positioned lowest in the vertical direction V among the extended projections 59 is positioned on a lower end of the one side surface 57 of the first housing 25a.

Referring to FIG. 3 and FIG. 5 again and viewed along the axial direction S, the extended projection 58 of the driven gear 24 (a part of the extended projection is shown by an alternate long and short double-dashed line in FIG. 5) and the extended projection 59 of the first housing 25a partially face each other in the axial direction S and form facing portions 67a and 67b according to rotation of the driven gear 24 to form a lubricant holding portion 100 capable of holding the lubricant L between these facing portions 67*a* and 67*b* of the extended projections of 58 and 59.

Top surfaces 68 of the extended projection 59 and a top surface 69 of the inner diameter portion 66 are arranged on the same plane. These top surfaces 68 and the top surface 69 are close parallel to the one side surface 32 of the driven gear 24. The interval F1 between the extended projections 58 and 59 facing each other is made close to a degree of which the lubricant L can be held between the facing portions 67*a* and 67*b* by surface tension.

When the driven gear 24 rotates to one side C1 of the circumferential direction as a predetermined direction of rotation, the distance G1 between the facing portions 67*a* and 67*b*, and the axis 24*a* of the driven gear 24 increases. When the driven gear 24 rotates to the other side C2 of the circumferential direction, the distance G1 between the facing portions 67*a* and 67*b*, and the axis 24*a* of the driven gear 24 is reduced. Thereby, the facing portions 67*a* and 67*b*, and the lubricant L held between the facing portions 67*a* and 67*b* move in the radial directions R, and the distance to the axis 24*a* (distance G1) changes.

Referring to FIG. 6, the paired extended projections 58 and 59 include side portions 70 and 71 facing each other. These side portions 70 and 71 are formed into smooth curved surfaces, and come close to each other while facing each other when the driven gear 24 rotates to one side C1 of the circumferential direction. Thereby, when the driven gear 24 rotates to one side C1 of the circumferential direction, the lubricant L held by these side portions 70 and 71 can be easily led into the section between the facing portions 67*a* and 67*b*. Therefore, the amount of lubrication L to be moved to the tooth portion of the driven gear 24 can be increased.

Referring to FIG. 2 and FIG. 7, the one side surface 32 and the other side surface 52 of the driven gear 24 are formed to be symmetrical to each other with respect to a virtual plane orthogonal in the axial direction S. The one side surface 32 and the other side surface 52 have the same construction.

In detail, the other side surface 52 of the driven gear 24 is a plane extending orthogonally in the axial direction S. On the other side surface 52, a plurality of concave portions 72 are formed between the inner diameter portion 63 and the outer diameter portion 64 of the driven gear 24. Each concave portion 72 is in a fan shape when it is viewed in the axial direction S. Between the concave portions 72 adjacent to each other in the circumferential direction C of the driven gear 24, an extended projection 61 is provided. For example, four extended projections 61 are arranged at even intervals in the circumferential direction C.

The number of the extended projections 61 on the other side surface 52 may be one, two, or three, or may be five or more.

The extended projection 61 are formed between the inner diameter portion 63 and the outer diameter portion 64, and extend along the radial directions R as a direction crossing the circumferential direction C (first directions). That is, the extended projection 61 crosses the circumferential direction C at generally 90 degrees, and extends radially. The extended projection 61 may cross the circumferential direction C at an angle less than 90 degrees. The extended projection 61 has a predetermined width B.

The inner diameter portion 63 connects the one end portions 61*a* of the extended projection 61 to each other. The outer diameter portion 64 connects the other end portions 61*b* of the extended projection 61 to each other.

Referring to FIG. 3 and FIG. 8, the one side surface 60 of the second housing 25*b* extends orthogonally in the axial direction S. The extended projection 62 of the second housing 25*b* is projectedly provided on this one side surface 60.

In this embodiment, corresponding to the number of the extended projections 61 on the other side surface 52 of the driven gear 24, four extended projections 62 are provided at even intervals in the circumferential direction C, however, the number of the extended projections 62 on the one side surface 60 may be one, two, or three, or may be five or more.

On the one side surface 60, an annular inner diameter portion 73 surrounding the bearing holding hole 49 for holding the fourth bearing 35 is projectedly provided. The extended projection 62 extends from the inner diameter portion 73 along third directions D3 as directions crossing the circumferential direction C.

The third directions D3 have an angle of about several tens of degrees (for example, 50 degrees) with respect to the circumferential direction C. In the section shown in FIG. 8 (viewed in a direction facing the driven gear 24 of the axial direction S), the one end portion 62*a* of each extended projection 62 is at a position skewed to the one side C1 of the circumferential direction with respect to the other end portion 62*b*.

Viewed along the axial direction S, the extended projection 59 of the first housing 25*a* (see FIG. 5) and the extended projection 62 of the second housing 25*b* (see FIG. 8) are inclined oppositely to each other with respect to the circumferential direction C.

Referring to FIG. 3 and FIG. 8 and viewed along the axial direction S, the extended projection 61 crosses the circumferential direction C at a crossing angle E3. Viewed along the axial direction S, the extended projection 62 (a part of the extended projections 62 is shown in FIG. 8) crosses the circumferential direction C at a crossing angle E4. Viewed along the axial direction S, the paired extended projections 61 and 62 are inclined oppositely to each other with respect to the circumferential direction C, and cross the circumferential direction C at the different crossing angles E3 and E4.

The one end portion 62*a* of the extended projection 62 is connected to each other by the inner diameter portion 73. The other end portion 62*b* of the extended projection 62 faces the tooth portion 31 of the driven gear 24 in the axial direction S. The other end portion 62*b* of one extended projection 62 (621) positioned highest in the vertical direction V among the extended projections 62 is close to the mesh region A of the gears 23 and 24.

Referring to FIG. 2, the other end portion 62*b* of one extended projection 62 (622) positioned lowest in the vertical direction V among the extended projections 62 is positioned on a lower end of the one side surface 60 of the second housing 25*b*.

Referring to FIG. 3 and FIG. 8 and viewed along the axial direction S, according to the rotation of the driven gear 24, the extended projection 61 of the driven gear 24 and the extended projection 62 of the second housing 25*b* partially face each other in the axial direction S and form facing portions 74*a* and 74*b* to form a lubricant holding portion 100 capable of holding the lubricant L between these facing portions 74*a* and 74*b* of the extended projections of 61 and 62.

Top surfaces 75 of the extended projection 62 and a top surface 76 of the inner diameter portion 73 are arranged on the same plane. These top surfaces 75 and the top surface 76 are close parallel to the other side surface 52 of the driven gear 24. The interval F2 between the extended projections 61 and 62 facing each other is made close to a degree of which the lubricant L can be held between the facing portions 74a and 74b by surface tension.

When the driven gear 24 rotates to the other side C2 of the circumferential direction, the distance G2 between the facing portions 74a and 74b, and the axis 24a of the driven gear 24 increases. When the driven gear 24 rotates to one side C1 of the circumferential direction, the distance G2 between the facing portions 74a and 74b, and the axis 24a of the driven gear 24 is reduced. Thereby, the facing portions 74a and 74b, and the lubricant L held between the facing portions 74a and 74b move in the radial directions R, and the distance to the axis 24a (distance G2) changes.

Referring to FIG. 3 and FIG. 5, with the above-described construction, when the distance G1 between the facing portions 67a and 67b with respect to the one side surface 32 of the driven gear 24, and the axis 24a of the driven gear 24 increases according to the rotation of the driven gear 24 to the one side C1 of the circumferential direction, as shown in FIG. 3 and FIG. 8, the distance G2 between the facing portions 74a and 74b with respect to the other side surface 52 of the driven gear 24, and the axis 24a of the driven gear 24 is reduced.

Similarly, when the distance G2 between the facing portions 74a and 74b with respect to the other side surface 52 of the driven gear 24, and the axis 24a of the driven gear 24 increases according to the rotation of the driven gear 24 to the other side C2 of the circumferential direction, as shown in FIG. 3 and FIG. 5, the distance G1 between the facing portions 67a and 67b with respect to one side surface 32 of the driven gear 24, and the axis 24a of the driven gear 24 is reduced.

Referring to FIG. 9, the paired extended projections 61 and 62 include side portions 77 and 78 facing each other. These side portions 77 and 78 are formed into smooth curved surfaces, and come close to each other while facing each other when the driven gear 24 rotates to the other side C2 of the circumferential direction. Thereby, when the driven gear 24 rotates to the other side C2 of the circumferential direction, the lubricant L held by these side portions 77 and 78 can be easily led into the section between the facing portions 74a and 74b. Therefore, the amount of lubricant L to be moved to the tooth portion of the driven gear 24 can be increased.

FIG. 10A, FIG. 10B, FIG. 10C, and FIG. 10D are schematic views of a main portion for explaining movement of the lubricant L due to the extended projections 58 and 59. FIG. 11A, FIG. 11B, FIG. 11C, and FIG. 11D are schematic views of a main portion for explaining movement of the lubricant L due to the extended projections 61 and 62.

The electric power steering apparatus having the above-described schematic construction operates as follows. That is, referring to FIG. 2, a part of the lubricant L exits from the mesh region A due to its own weight, vibrations of the respective gears 23 and 24, and mesh between the gears 23 and 24, etc., and drops between the one side surface 32 of the driven gear 24 and the one side surface 57 of the first housing 25a.

Figure 10A:
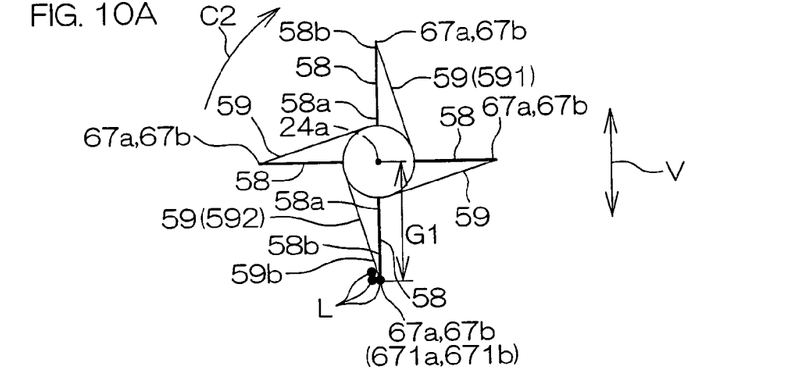
FIG. 10A, FIG. 10B, FIG. 10C, and FIG. 10D are schematic views of a main portion for explaining movement of a lubricant due to the extended projections.

As shown in FIG. 2 and FIG. 10A, a part of the lubricant L reaches the lower end in the vertical direction V due to dropping. When the driven gear 24 rotates to the other side C2 of the circumferential direction, the lubricant L at the lower end in the vertical direction V is held between the facing portions 67a and 67b (671a and 671b). The facing portions 671a and 671b at this time are formed by the other end portion 59b of the extended projection 592 at the lower end in the vertical direction V and the other end portion 58b of the extended projection 58 facing the other end portion 59b.

Figure 10B:
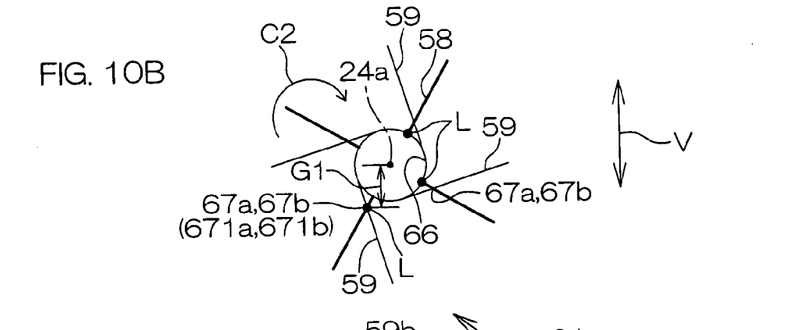

When the driven gear 24 further rotates to the other side C2 of the circumferential direction, as shown in FIG. 10B, the distance G1 between the facing portions 671a and 671b, and the axis 24a becomes shorter, and the lubricant L is moved to the inner diameter portion 66 side of the first housing 25a.

Figure 10C:
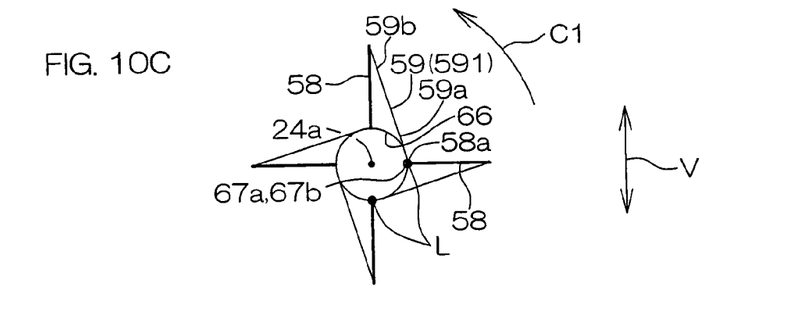

Referring to FIG. 10C, from the state in that the lubricant L is present on the inner diameter portion 66 side, when the driven gear 24 rotates to the one side C1 of the circumferential direction, the lubricant L held near the inner diameter portion 66 is held between the facing portions 67a and 67b. The facing portions 67a and 67b at this time are formed by one end portion 59a of the extended projection 591 positioned at the upper side in the vertical direction V and one end portion 58a of the extended projection 58 of the driven gear 24 corresponding to this one end portion 59a.

Figure 10D:
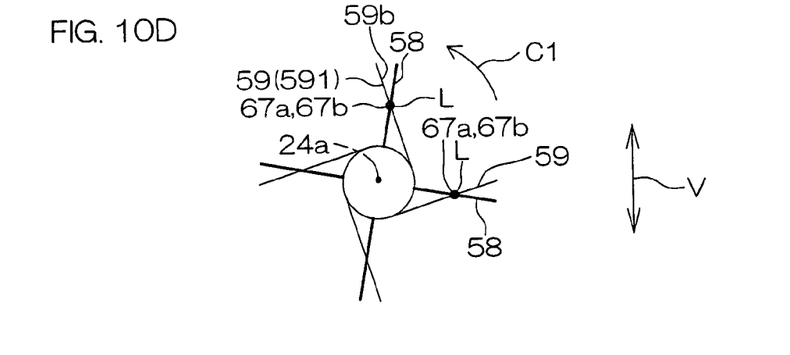

As shown in FIG. 10D, according to the movement of the facing portions 67a and 67b at this time, the lubricant L is moved to the other end portion 59b of the extended projection 591, and is supplied from the other end portion 59b to the mesh region A (see FIG. 2).

As shown in FIG. 2, a part of the lubricant L exits from the mesh region A due to its own weight, vibrations of the respective gears 23 and 24, and mesh between the gears 23 and 24, etc., and drops between the other side surface 52 of the driven gear 24 and the one side surface 60 of the second housing 25b.

Figure 11A:
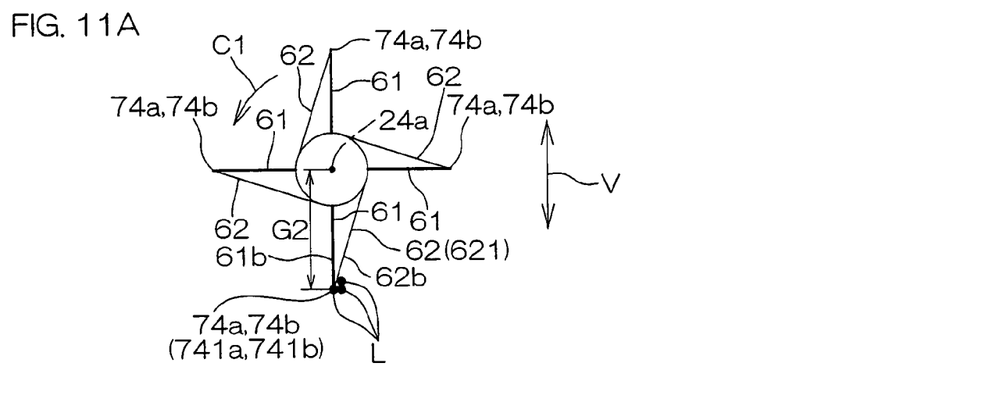
FIG. 11A, FIG. 11B, FIG. 11C, and FIG. 11D are schematic views of a main portion for explaining movement of a lubricant due to the extended projections.

As shown in FIG. 2 and FIG. 11A, a part of the lubricant L reaches the lower end in the vertical direction V due to dropping. When the driven gear 24 rotates to the one side C1 of the circumferential direction, the lubricant L at the lower end in the vertical direction V is held between the facing portions 74a and 74b (741a and 741b). The facing portions 741a and 741b in this case are formed by the other end portion 62b of the extended projection 621 at the lower end in the vertical direction V and the other end portion 61b of the extended projection 61 facing the other end portion 62b.

Figure 11B:
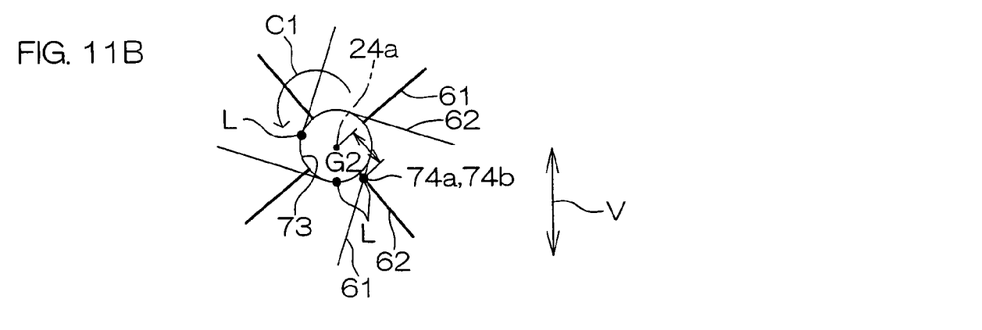

When the driven gear 24 further rotates to the one side C1 of the circumferential direction, as shown in FIG. 11B, the distance G2 between the facing portions 74a and 74b, and the axis 24a becomes shorter, and the lubricant L is moved to the inner diameter portion 73 side of the second housing 25b.

Figure 11C:
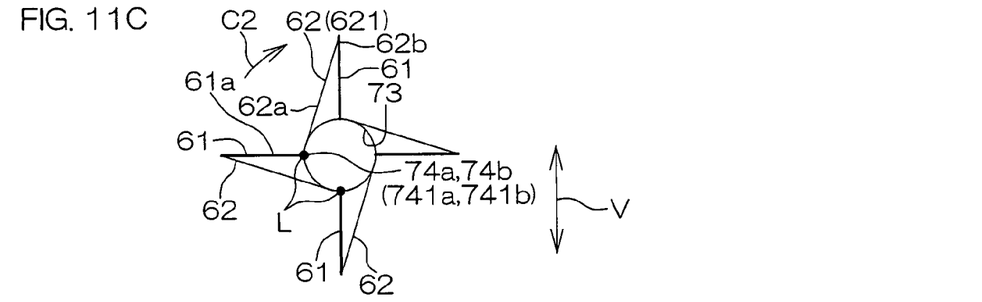

Referring to FIG. 11C, from the state in that the lubricant L is present on the inner diameter portion 73 side, when the driven gear 24 rotates to the other side C2 of the circumferential direction, the lubricant L held at the inner diameter portion 73 is held between the facing portions 741a and 741b. The facing portions 741a and 741b in this case are formed by the one end portion 62a of the extended projection 621 positioned at the upper side in the vertical direction V and the one end portion 61a of the extended projection 61 of the driven gear 24 corresponding to the one end portion 62a.

Figure 11D:
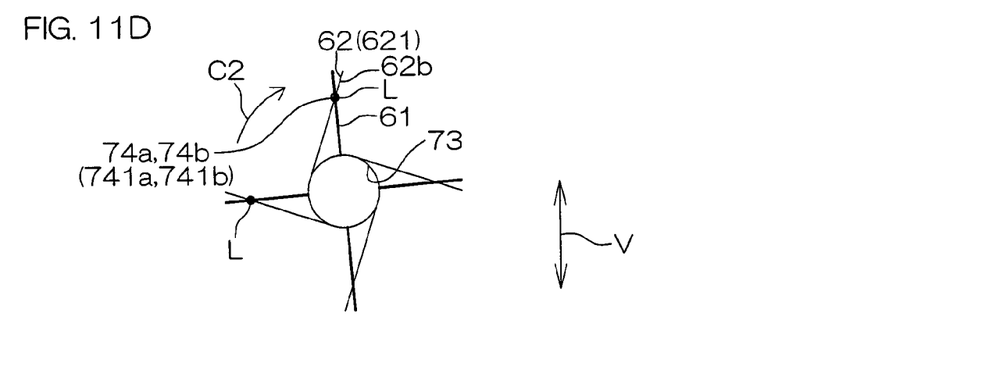

As shown in FIG. 11D, according to the movement of the facing portions 741a and 741b, the lubricant L is moved to the other end portion 62b of the extended projection 621, and is supplied from the other end portion 62b to the mesh region A (see FIG. 2).

This embodiment achieves the following action and effect. That is, according to the rotation of the driven gear 24, the facing portions 67a and 67b, the facing portions 74a and 74b, and the lubricant L held between the facing portions 67a and 67b and between the facing portions 74a and 74b can be moved in the direction in which the corresponding extended projections 59 and 62 of the driven gear 24 extend. Thereby, the lubricant L can be moved to the tooth portion 31 of the driven gear 24. As a result, a sufficient amount of the lubricant L can be supplied to the mesh region A of the gears 23 and 24.

In a conventional construction, that is, in a construction having no extended projections facing each other on the driven gear 24 and the housing 25, no construction is provided for returning grease extruded due to mesh between gears in the mesh region to the mesh region. Therefore, wearing of tooth surfaces due to grease shortage (lubrication failure) in the mesh region has been a problem. However, according to the embodiment, such lubrication failure can be prevented without adding grease from the outside.

In addition, the lubricant L is held between the corresponding facing portions 67a and 67b and 74a and 74b by surface tension and moved. Therefore, no centrifugal force is necessary for moving the lubricant L. Therefore, even if the rotational speed of the driven gear 24 is as low as several rpm, the lubricant L can be reliably moved to the upper side in the vertical direction V and supplied to the tooth portion 31 of the driven gear 24 (mesh region A). Without being influenced by the rotational speed of the driven gear 24, sufficient lubrication can be performed under wider driving conditions. As the lubricant L, lubricating oil and grease can be used. Various lubricants can be applied, and sufficient lubrication can be performed under wider driving conditions.

Furthermore, the extended projections 58 and 59 facing each other on the one side surface 32 side of the driven gear 24 cross the circumferential direction C at different crossing angles E1 and E2 when they are viewed along the axial direction S. Thus, the longitudinal direction of the extended projection 58 of the driven gear 24 and the longitudinal direction of the extended projection 59 of the first housing 25 are made different to each other with respect to the circumferential direction C. With such simple construction, when viewed along the axial direction S, these extended projections 58 and 59 can be made to partially face each other.

Similarly, the extended projections 61 and 62 facing each other on the other side surface 52 side of the driven gear 24 cross the circumferential direction C at different crossing angles E3 and E4 when they are viewed along the axial direction S. Thus, the longitudinal direction of the extended projection 61 of the driven gear 24 and the longitudinal direction of the extended projection 62 of the second housing 25b are made different to each other with respect to the circumferential direction C. With such a simple construction, when viewed along the axial direction S, these extended projections 61 and 62 can be made to partially face each other.

The extended projections 58 and 59 facing each other on one side surface 32 side of the driven gear 24 are inclined oppositely to each other with respect to the circumferential direction C when they are viewed along the axial direction S. Thus, the longitudinal direction of the extended projection 58 of the driven gear 24 and the longitudinal direction of the extended projection 59 of the first housing 25a are inclined oppositely to each other with respect to the circumferential direction C. With such a simple construction, when viewed along the axial direction S, these extended projections 58 and 59 can be made to partially face each other.

Similarly, the extended projections 61 and 62 facing each other on the other side surface 52 side of the driven gear 24 are inclined oppositely to each other with respect to the circumferential direction C when viewed along the axial direction S. Thus, the longitudinal direction of the extended projection 61 of the driven gear 24 and the longitudinal direction of the extended projection 62 of the second housing 25b are inclined oppositely to each other with respect to the circumferential direction C. With such a simple construction, when viewed along the axial direction S, these extended projections 61 and 62 can be made to partially face each other.

In addition, the distance G1 between the facing portions 67a and 67b on the one side surface 32 side of the driven gear 24, and the axis 24a of the driven gear 24 increases when rotating to the one side C1 of the circumferential direction. In this case, by rotating the driven gear 24 to one side C1 of the circumferential direction C, the lubricant L held between the facing portions 67a and 67b can be moved to the outer diameter side of the driven gear 24.

Similarly, the distance G2 between the facing portions 74a and 74b on the other side surface 52 side of the driven gear 24, and the axis 24a of the driven gear 24 is reduced when rotating to the one side C1 of the circumferential direction. In this case, by rotating the driven gear 24 to the one side C1 of the circumferential direction, the lubricant L held between the facing portions 74a and 74b can be moved to the inner diameter side of the driven gear 24.

When the distance (G1 or G2) between either the facing portions 67a and 67b or facing portions 74a and 74b, and the axis 24a of the driven gear 24 increases, the distance (G2 or G1) between the other facing portions and the axis 24a of the driven gear 24 is reduced.

Thereby, whichever side the driven gear 24 rotates to, both of the lubricant L moving away from the axis 24a and the lubricant L coming closer to the axis 24a are present. Whichever side the driven gear 24 rotates to, the lubricant L can be supplied to the inner diameter side and the outer diameter side of the driven gear 24, and as a result, the lubricant L can be reliably moved to the tooth portion 31 of the driven gear 24.

The axial direction S of the driven gear 24 is inclined with respect to the vertical direction V. Thereby, the lubricant L that dropped down due to vibrations and its own weight can be raised and circulated.

By the above-described construction, the electric power steering apparatus 1 is realized which can satisfactorily prevent oil leakage using grease with viscosity higher than that of lubricating oil and can perform sufficient lubrication even at a rotational speed as low as several rpm.

The invention is not limited to the contents of the embodiment described above, and various modifications are possible within the scope of claims.

For example, when the facing portions 67a and 67b of the extended projections 58 and 59 on the one side surface 32 side of the driven gear 24 moves away from the axis 24a, the facing portions 74a and 74b of the extended projections 61 and 62 on the other side surface 52 side of the driven gear 24 may also be made to move away from the axis 24a. In this case, when the facing portions 67a and 67b of the extended projections 58 and 59 on the one side surface 32 side of the driven gear 24 come closer to the axis 24a, the facing portions 74a and 74b of the extended projections 61 and 62 on the other side surface 52 side of the driven gear 24 also come closer to the axis 24a.

Furthermore, the extended projections 58 and 59 on the one side surface 32 side of the driven gear 24 or the extended projections 61 and 62 on the other side surface 52 side of the driven gear 24 may be discarded.

Furthermore, an extended projection may be provided on at least one of the pair of side surfaces of the drive gear 23 and on a side surface of the housing facing the side surface, respectively. In this case, the extended projection is formed similarly to the extended projections 58 and 59 and the extended projections 61 and 62 mentioned above. Thereby, according to the rotation of the drive gear 23, the lubricant L can be made to move away from the axis 23a of the drive gear 23, and as a result, the lubricant L can be supplied to the mesh region A.

Additionally, the invention is applicable to a general apparatus other than the electric power steering apparatus.

The invention is described in detail above based on a detailed embodiment, however, a person skilled in the art who understands the contents described above will easily conceive alterations and equivalents. Therefore, the invention should be construed to include everything within the scope of the claims and a scope equivalent thereto.

The present application corresponds to Japanese Patent Application No. 2006-92088 filed on Mar. 29, 2006 to the Japanese Patent Office, and the whole disclosure of this application is incorporated herein by reference.

The invention claimed is:

1. A gear device comprising:
a plurality of gears which mesh with each other;
a housing for housing the plurality of gears, the housing including a plurality of extended projections and an annular inner diameter portion; and
a lubricant housed in the housing, wherein
an extended projection is provided on at least one side surface of at least one gear selected from the plurality of gears,
the extended projections of the housing are provided on a side surface of the housing facing the at least one side surface of the selected gear, and extend tangentially outward from the annular inner diameter portion,
the extended projection of the selected gear and the extended projections of the housing extend in a direction crossing the circumferential direction of the selected gear, and
when viewed along an axial direction of the selected gear, the extended projection of the selected gear and the extended projections of the housing partially face each other in the axial direction of the selected gear and form facing portions to form a lubricant holding portion capable of holding the lubricant between the facing portion of the extended projection of the selected gear and the facing portion of the extended projections of the housing to move the lubricant held in the lubricant holding portion to a gear mesh portion of the selected gear according to rotation of the selected gear.

2. The gear device according to claim 1, wherein the extended projection of the selected gear and the extended projections of the housing cross the circumferential direction of the selected gear at different crossing angles when viewed along the axial direction of the selected gear.

3. The gear device according to claim 1, wherein the facing portions move in a radial direction of the selected gear according to rotation of the selected gear.

4. The gear device according to claim 1, wherein the extended projection of the selected gear and the extended projections of the housing are inclined oppositely to each other with respect to the circumferential direction of the selected gear when viewed along the axial direction of the selected gear.

5. The gear device according to claim 1, wherein a distance between the facing portions and a center of the selected gear increases or reduces when the selected gear rotates in a predetermined direction of rotation.

6. The gear device according to claim 1, wherein
the extended projection of the selected gear is provided on each of a pair of side surfaces of the selected gear, and
the extended projections of the housing include an extended projection corresponding to the extended projection on each side surface of the selected gear, and
when the distance between the facing portions with respect to the extended projection of the one side surface of the selected gear and the center of the selected gear increases according to rotation of the selected gear, the distance between the facing portions with respect to the extended projection on the other side surface of the selected gear and the center of the selected gear reduces.

7. The gear device according to claim 1, wherein the axial direction of the selected gear crosses a vertical direction.

8. An electric power steering apparatus comprising an electric motor for assisting steering and a steering mechanism, wherein an output of the electric motor is transmitted to the steering mechanism via the gear device according to claim 7.

9. An electric power steering apparatus comprising an electric motor for assisting steering and a steering mechanism, wherein an output of the electric motor is transmitted to the steering mechanism via the gear device according to claim 6.

10. An electric power steering apparatus comprising an electric motor for assisting steering and a steering mechanism, wherein an output of the electric motor is transmitted to the steering mechanism via the gear device according to claim 5.

11. An electric power steering apparatus comprising an electric motor for assisting steering and a steering mechanism, wherein an output of the electric motor is transmitted to the steering mechanism via the gear device according to claim 4.

12. An electric power steering apparatus comprising an electric motor for assisting steering and a steering mechanism, wherein an output of the electric motor is transmitted to the steering mechanism via the gear device according to claim 3.

13. An electric power steering apparatus comprising an electric motor for assisting steering and a steering mechanism, wherein an output of the electric motor is transmitted to the steering mechanism via the gear device according to claim 2.

14. An electric power steering apparatus comprising an electric motor for assisting steering and a steering mechanism, wherein an output of the electric motor is transmitted to the steering mechanism via the gear device according to claim 1.

* * * * *